US010690041B2

United States Patent
Grava et al.

(10) Patent No.: US 10,690,041 B2
(45) Date of Patent: Jun. 23, 2020

(54) EXPANSION TANK FOR A MOTOR VEHICLE COOLING SYSTEM

(71) Applicant: FCA Italy S.p.A., Turin (IT)

(72) Inventors: Giorgio Grava, Turin (IT); Maurizio Giani, Turin (IT); Giacinto Giai Gischia, Turin (IT); Davide Balestro, Turin (IT)

(73) Assignee: FCA Italy S.p.A., Turin (IT)

( * ) Notice: Subject to any disclaimer, the term of this patent is extended or adjusted under 35 U.S.C. 154(b) by 234 days.

(21) Appl. No.: 15/617,624

(22) Filed: Jun. 8, 2017

(65) Prior Publication Data

US 2017/0356328 A1    Dec. 14, 2017

(30) Foreign Application Priority Data

Jun. 10, 2016   (EP) .................................... 16425050

(51) Int. Cl.
*F01P 11/02*     (2006.01)
*B60K 11/02*     (2006.01)
*F01P 3/20*      (2006.01)

(52) U.S. Cl.
CPC ............ *F01P 11/029* (2013.01); *B60K 11/02* (2013.01); *F01P 3/20* (2013.01); *F01P 11/028* (2013.01)

(58) Field of Classification Search
CPC ............ F01P 11/029; F01P 11/02; F01P 11/00
See application file for complete search history.

(56) References Cited

U.S. PATENT DOCUMENTS

| 5,135,049 A * | 8/1992 | Attinger ................. F01P 11/029 123/41.51 |
| 5,762,130 A * | 6/1998 | Uibel ................... F01P 11/0276 123/41.54 |
| 2009/0290137 A1 * | 11/2009 | Vermeulen .............. G03F 7/707 355/72 |
| 2012/0031798 A1 * | 2/2012 | DesLauriers ......... B65B 25/001 206/524.1 |

FOREIGN PATENT DOCUMENTS

| EP | 2042704 A1 | 4/2009 |
| FR | 2866064 A1 | 8/2005 |
| JP | 2002310377 A | 10/2002 |
| WO | WO2004001204 A1 | 12/2003 |
| WO | WO-2008107788 A1 * | 9/2008 ................ F01P 7/16 |
| WO | WO2008107788 A1 | 9/2008 |
| WO | WO2009113019 | 9/2009 |

OTHER PUBLICATIONS

EP16425050.8: Search Report dated Jan. 16, 2017 (16 pages).

* cited by examiner

*Primary Examiner* — Steven A. Reynolds
*Assistant Examiner* — Javier A Pagan
(74) *Attorney, Agent, or Firm* — Greer, Burns & Crain, Ltd.

(57) ABSTRACT

An expansion tank for a cooling system of a motor vehicle has an inlet mouth and is provided with a shell in plastic material having a wall which defines a cavity for containing a coolant liquid; the shell has, in addition, a projecting collar, at the inlet mouth, and a first inner tubular wall, which protrudes downwards into the cavity and defines a passage with a lower outlet opening, to make the coolant liquid flow into the cavity; the shell has, in addition, a second tubular wall, projecting upwards into the cavity and defining a compartment which is vertically aligned with the passage and has an upper overflow opening vertically arranged at a (Continued)

height that is equal to or greater than that of the outlet opening.

8 Claims, 3 Drawing Sheets

EXPANSION TANK FOR A MOTOR VEHICLE COOLING SYSTEM

RELATED APPLICATIONS

This application claims priority from European Patent Application No. 16425050.8 filed on Jun. 10, 2016, the disclosure of which is incorporated herein by reference in its entirety.

FIELD OF THE DISCLOSURE

The present invention relates to an expansion tank for a motor vehicle cooling system.

BACKGROUND

As is known, the heat engine of a motor vehicle is cooled by a cooling system which uses as a coolant fluid a mixture of water/ethylene glycol and provides for an expansion tank fixed to a support structure placed in the engine compartment of the motor vehicle.

The expansion tank is a container which communicates with the exterior via a series of inlet and outlet mouths. Said mouths are provided at respective sleeves and collars which protrude from the container and are made of plastic material, in one piece with the container itself. Then, during the installation of the cooling system, corresponding piping is fitted on said collars to connect the inside of the container with the motor and with the radiator.

In some solutions, at the inlet mouth, the expansion tank is provided with a cylindrical bushing, defining an insert that has a radial thickness of about 0.5 mm and is fixed inside the plastic collar, to reduce the transmission of heat from the coolant fluid to said collar. According to the European patent application 16162753.4, in the name of the same applicant, in particular, it is provided that said insert is made of plastic and is snap-fixed to the collar.

In the known solutions, immediately after turning off the engine, a gurgling sound is generally perceived coming from the expansion tank. This gurgling is essentially due to the bubbles of vapor and coolant fluid which continue, even if for a short time, to enter the container from the inlet mouth, due to the inertia of the coolant fluid in the cooling system and the high temperatures in the return line from the engine to the expansion tank.

This gurgling is relatively annoying, particularly in solutions where the engine is equipped with the so-called "start-stop" function and therefore subject to a relatively high number of shut-downs.

SUMMARY OF THE INVENTION

The purpose of the present invention is to make an expansion tank for a motor vehicle cooling system, which makes it possible to simply and inexpensively overcome the drawback described above.

According to the present invention, an expansion tank for a motor-vehicle cooling system is made, as defined in claim 1.

According to the present invention a manufacturing process for making different expansion tanks, as defined in claim 10, is also provided.

BRIEF DESCRIPTION OF THE DRAWINGS

For a better understanding of the present invention, a preferred embodiment will now be described by way of a non-limiting example and with reference to the appended drawings, wherein.

DETAILED DESCRIPTION

Figure 1:
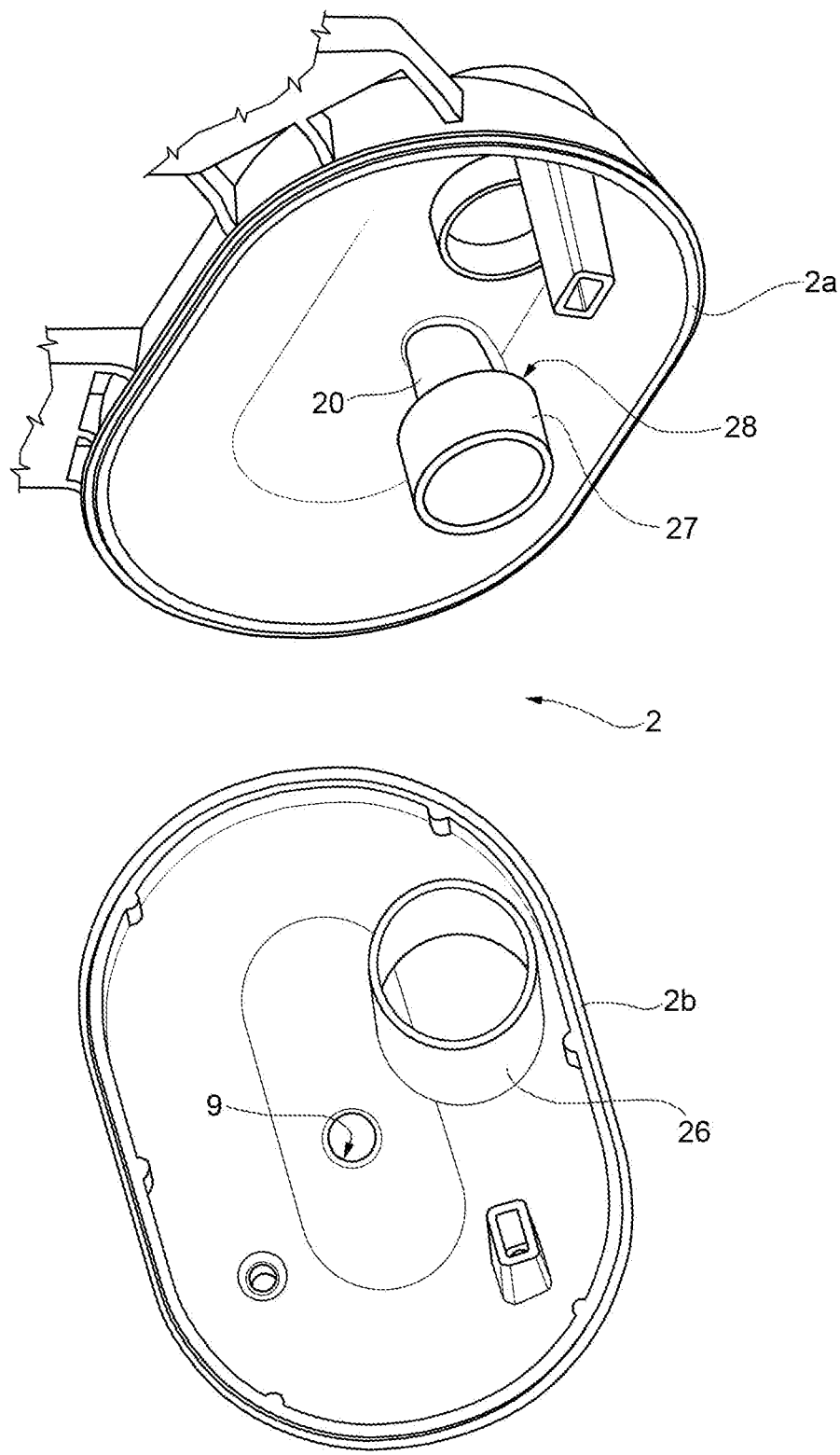
FIG. 1 is a perspective and exploded view of a preferred embodiment of the expansion tank for a motor vehicle cooling system, according to the present invention.

In FIG. 1, reference numeral 1 denotes an expansion tank, forming part of a cooling system (not shown) which, in use, is placed in an engine compartment of a motor vehicle. Said system is configured so as to make a coolant fluid circulate to remove heat from an internal combustion engine (not shown).

The expansion tank 1 comprises a shell 2, which is made of plastic material, is made in a single piece or multiple pieces, fixed to each other. In FIG. 1, a version is shown in which the shell 2 is composed of an upper half-shell 2a and a lower half-shell 2b.

Figure 2:
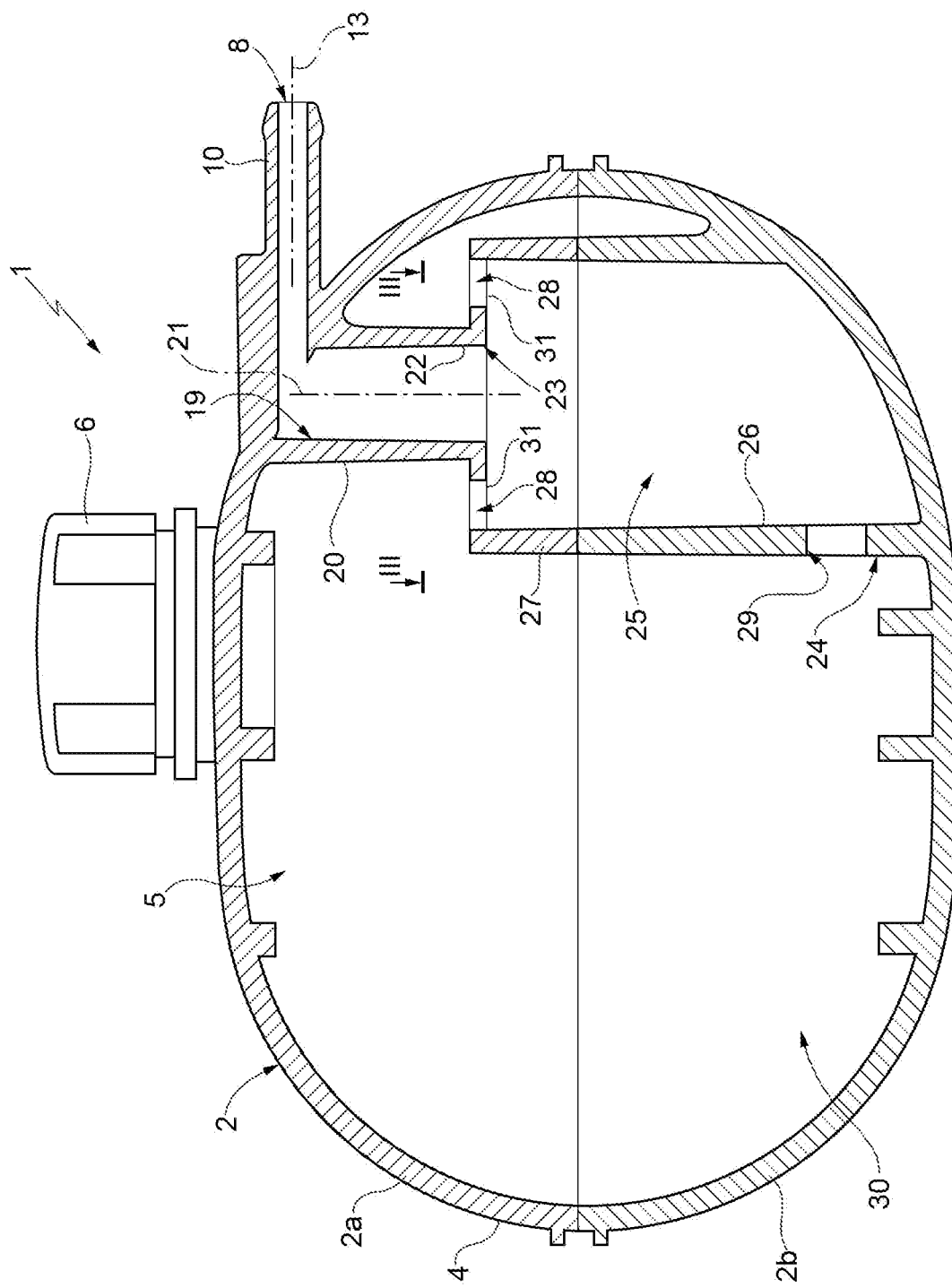
FIG. 2 is a cross-section along a vertical plane of the tank in FIG. 1, shown in a simplified manner and with parts removed for clarity.

As shown in a simplified manner and schematically in FIG. 2, the shell 2 comprises a wall 4 defining a container, i.e. an inner cavity 5, suitable to receive and contain the coolant fluid. In particular, the wall 4 has, at an upper end, an opening closed by a removable cap 6, to top-up the level of the coolant fluid in the cavity 5. The latter communicates with the remaining part of the cooling system through an inlet mouth 8 and an outlet mouth 9 (FIG. 1). The mouths 8 and 9, in use, are connected via respective pipes (not shown) to the remaining part of the cooling system.

The inlet mouth 8 is provided at an inlet collar 10, colloquially referred to as "filler", which constitutes part of the shell 2 and protrudes from the wall 4 outwards along an axis 13. In the embodiment shown in FIG. 4, as will be better explained below, the inner surface of the collar 10 defines an axial through seat 15, which is engaged by a tubular insert 16 coaxial with the collar 10 and effectively defining the mouth 8.

Figure 3:
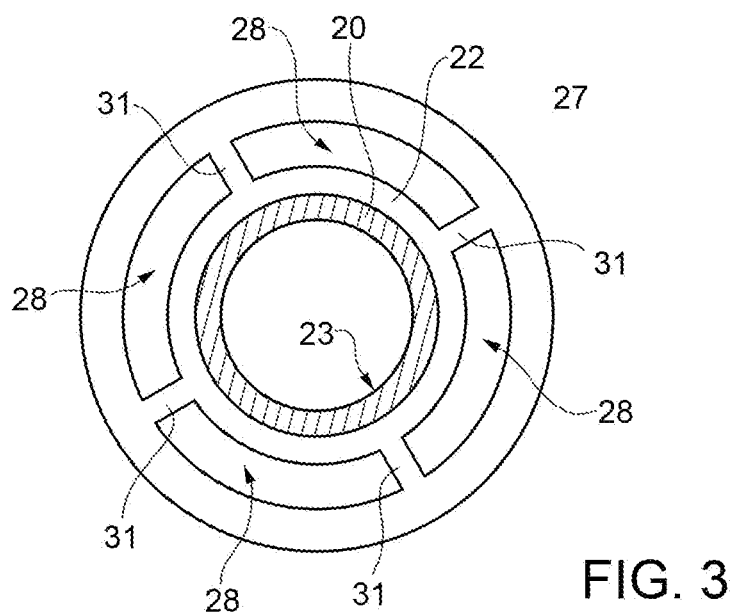
FIG. 3 is a cross-section, on an enlarged scale, according to the plane in FIG. 2.

With reference to FIGS. 2 and 3, the mouth 8 communicates with the cavity 5 through a passage 19 defined by a tubular wall 20, which constitutes part of the shell 2, protrudes from an upper area of the wall 4 downwards inside the cavity 5, along a substantially vertical axis 21, and ends, at the bottom, with a portion 22 defining an outlet opening 23.

The shell 2 further comprises a tubular wall 24, which protrudes upwards from a lower area of the wall 4 in the cavity 5, i.e. towards the wall 20, and defines a compartment 25 which is aligned along the axis 21 with the passage 19.

The wall 24 comprises a lower end portion 26, adjacent to the wall 4, and an upper end portion 27, defining an overflow opening 28.

The portion 26 has a hole 29, which places the compartment 25 in communication with the main part of the cavity 5, indicated by reference numeral 30. The hole 29 keeps the compartment 25, with the liquid arriving from the mouth 8, i.e. from the engine and from the turbine, in communication with the remaining part 30, which must constantly provide the necessary flow of liquid to the outlet mouth 9, so that it constantly levels the height of the liquid contained in the compartment 25 and in the remaining part 30.

According to one aspect of the present invention, the outlet opening 23 is arranged, vertically, at a height that is less than or equal to that of the overflow opening 28. In particular, the outlet opening 23 is arranged at a lower height than that of the overflow opening 28, which is therefore engaged by the portion 22 of the wall 20.

Preferably, the overflow opening 28 is positioned at a height that is greater than or equal to a maximum reference level established at the design stage and corresponding to the maximum amount of coolant fluid which should be provided in the cavity 5. Normally, said reference level is represented by a notch, a protrusion or a symbol on the wall 4, to be easily identified visually for topping up the coolant fluid in the cooling system.

This way, the hot coolant fluid entering the tank 1 through the mouth 8 flows into the passage 19 and, from the latter, into the compartment 25. From the compartment 25, the liquid can reach the main part 30 of the cavity 5, even by overflowing through the overflow opening 28, as indicated by the arrows in FIG. 2, as well as through the hole 29. It is therefore evident that the compartment 25 defines a so-called stilling well, in that it reduces the turbulence of the flow coming out of the passage 19. In other words, by overflowing, the liquid reaches the main part 30 of the cavity 5 in a relatively slow manner and with a limited fall. Moreover, the compartment 25 improves the deaeration capacity of the coolant liquid in the tank 1. This way, the annoying gurgling sounds that can be heard immediately after stopping the engine are limited.

Preferably, as seen in FIG. 3, the portions 22 and 27 are connected by radial spokes 31. In particular, the spaces between the spokes 31 define the overflow opening 28.

Conveniently, as may be seen in FIGS. 1 and 2, the wall 20, the spokes 31 and the portion 27 constitute part of the semi-shell 2a. At the same time, the lower edge of the portion 27 is fixed to the upper edge of the portion 26, which in turn constitutes part of the half-shell 2b. Conveniently, the attachment between the edges of the portions 27 and 26 is defined by elastic tabs (not shown) snap-coupled in respective retention seats (not shown) and/or by a heat-welding of the plastic material. As an alternative to heat-welding, a layer of glue may be provided for.

The attachment between the wall 20 and the portion 26 defines a structural stiffening of the shell 2, compared to the prior solutions, since it fastens the half-shells 2a, 2b to each other, not only at their perimeter along the wall 4, but also inside the cavity 5.

Figure 4:
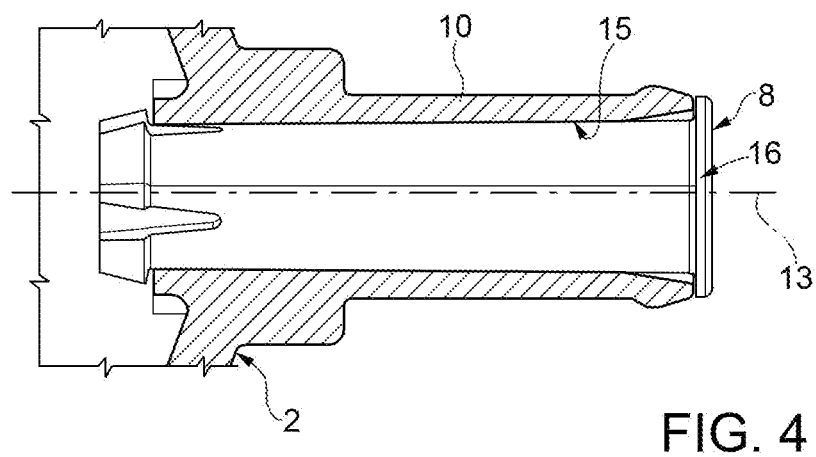
FIG. 4 shows, on an enlarged scale and in cross-section, an inlet mouth of the expansion tank and relates to an insert provided at said inlet mouth, according to a variant of what is shown in FIG. 3.

Independently of the features of the structure defining the compartment 25, with reference to FIG. 4 it may be noted that the insert 16 is held in a fixed axial position relative to the collar 10 by a snap coupling. The insert comprises a tubular portion 35, preferably cylindrical, which engages the seat 15. In particular, the outer diameter of the portion 35 is equal to the inner diameter of the collar 10, possibly without radial clearance and without interference.

The insert 16 has a dual function, namely, the function of defining an inner stiffening for the collar 10 to support the stresses; and the function of shielding the collar 10 from the heat of the coolant liquid entering the tank 1 through the mouth 8.

According to a preferred aspect of the present embodiment, regardless of the features of the structure defining the compartment 25, the insert 16 is made in one piece in plastic material and is colored in mass.

The plastic material of the insert 16 makes it possible to have a relatively low heat conduction coefficient and to be able to obtain optimal flexibility and elasticity for the snap coupling.

At the same time, the mass pigmentation in the plastic material of the insert 16 is used as a visual identification to provide corresponding information to the users, indicative of the internal diameter of the insert 16. This way, it is possible to visually identify from the outside the transversal cross section of the insert 16 and, thus, the maximum flow rate of the liquid entering the tank 1, defined at the design stage.

Figure 5:
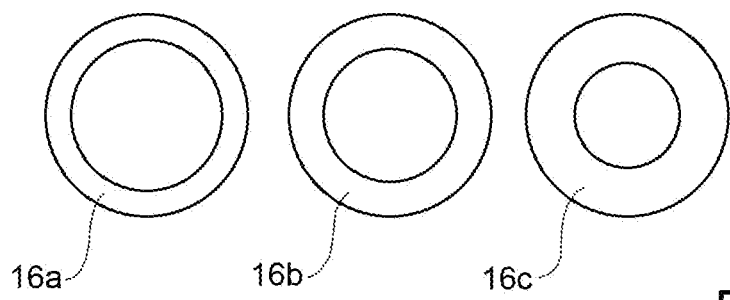
FIG. 5 shows, in cross-section, three inserts, having a different inner diameter from each other, which can be used at the inlet mouth in FIG. 4.

It is thus possible to standardize the manufacture of the shell 2, such as shape and size, and obtain different tanks 1, i.e. suitable for different engines (petrol, diesel, of varying engine size etc.) and/or for different cooling systems. In fact, the shells 2 of the various tanks 1 are all made the same as each other. The most suitable insert 16 is then selected and fitted with an inner diameter established previously according to the required flow value, defined at the design stage for that type of cooling system and/or for that type of engine. As shown in FIG. 5, the inserts 16a, 16b, 16c of the various tanks differ only by their inner diameter, and then by their color, which is predetermined so as to have a one to one correspondence with the inner diameter value.

As a result, the various tanks can be recognized and distinguished from each other, during storage or during installation on the vehicle, by the color of the insert 16. In particular, in stock there will be a kit of tanks differing only in their inner diameter and, thus, by the color of the inserts 16a, 16b, 16c. Consequently, this standardization significantly simplifies the manufacture and storage of the tanks, in particular the manufacture of the shell 2 which can be made on a larger scale.

From the above description with reference to FIGS. 1 to 3, it is evident that the stilling well defined by the compartment 26 makes it possible to limit the gurgling which is perceived normally immediately after stopping the engine due to the flow of liquid which tends to continue to enter the tank 1 and because of the steam in the liquid due to high temperatures.

The envisaged solution, thus alters the prior solutions in a negligible manner and makes it possible to achieve a stiffening of the shell 2.

Regardless of the compartment 25, the solution with inserts 16a, 16b, 16c in plastic, of different inner diameters, makes it possible to obtain different tanks which are made in a standardized manner producing shells 2 equal to each other in shape and size. The recognition of the various tanks is then facilitated by the different color of the inserts 16a, 16b, 16c, each associated with a relative inner diameter value, and thus with a relative specific application.

From the above, lastly it appears evident that modifications and variations may be made to the expansion tank 1 described and illustrated while remaining within the sphere of protection of the present invention as defined in the appended claims.

In particular, the portions 22 and 27 may be detached from one another.

The invention claimed is:

1. An expansion tank for a motor-vehicle cooling system, the expansion tank having an inlet mouth and comprising:
   a plastic shell comprising:
   a) a wall defining a cavity for containing a coolant liquid;
   b) a collar at said inlet mouth, said collar being outwardly projecting from said wall;

c) a first tubular wall, projecting from an upper zone of said wall downwards into said cavity and defining a passage, which places said inlet mouth in communication with said cavity and ends, at the bottom, with an outlet opening;

wherein said shell comprises a second tubular wall, protruding from a lower zone of said wall upwards in said cavity and defining a compartment, which is vertically aligned with said passage and ends, at the top, with an overflow opening; said outlet opening being vertically arranged at a height less than or equal to that of said overflow opening;

wherein said first and second tubular wall are connected to each other by at least one spoke.

2. The tank according to claim 1, wherein said outlet opening is arranged at a lower height than that of said overflow opening.

3. The tank according to claim 1, wherein said first and second tubular wall are joined to each other by a plurality of spokes; said overflow opening being defined by spaces between said spokes.

4. The tank according to claim 1, wherein said shell is formed by a lower half-shell and an upper half-shell; said second tubular wall comprising:

a lower end portion, adjacent to said wall, and an upper end portion, defining said overflow opening;

said lower and upper end portions being fixed to each other.

5. The tank according to claim 4, further comprising a snap coupling which couples said upper and lower end portions to each other.

6. The tank according to claim 4, further comprising a heat-sealing of plastic material, fixing said lower and upper end portions to each other.

7. The tank according to claim 4, further comprising an adhesive fixing said lower and upper end portions to each other.

8. The tank according to claim 1, wherein said second tubular wall has a hole, which places said compartment in communication with the remaining part of said cavity.

\* \* \* \* \*